Aug. 22, 1939.　　　　F. M. CLARK　　　　2,170,782
ELECTRIC CAPACITOR
Filed March 18, 1937
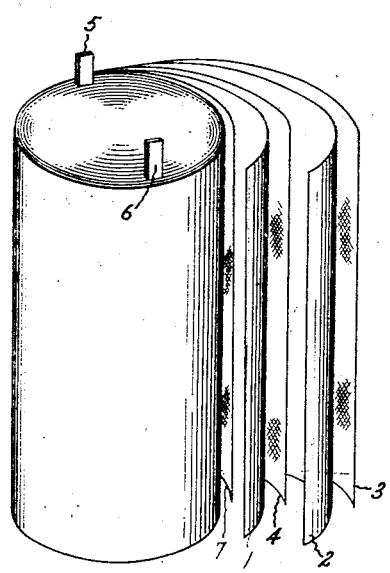
Inventor:
Frank M. Clark,
by Harry E. Dunham
His Attorney.

Patented Aug. 22, 1939

2,170,782

UNITED STATES PATENT OFFICE 2,170,782

ELECTRIC CAPACITOR

Frank M. Clark, Pittsfield, Mass., assignor to General Electric Company, a corporation of New York Application March 18, 1937, Serial No. 131,634

8 Claims. (Cl. 175—41)

The present invention relates to electric capacitance devices and comprises in particular electric capacitors (condensers) which contain a new dielectric material consisting in part at least of chlorinated diphenylene oxide.

Heretofore in the fabrication of capacitors containing a dielectric material of high resistivity (as distinguished from electrolytic capacitors) it has been considered highly advantageous to employ dielectric materials which are liquid under operating conditions.

For some types of capacitors, however, it is undesirable for various reasons to use liquid dielectric materials. For example, for the fabrication of capacitors of relatively small size solid dielectric materials are desired. However, it has been generally observed that solids have lower dielectric constants than liquids. For example, nitrobenzene has the relatively high dielectric constant of 32, when liquid at ordinary temperatures, but when solidified it has a dielectric constant of only 2 to 3.

I have discovered that solid chlorinated diphenylene products constitute an exception to this general rule. These products have dielectric constants varying from 4 (monochlor) to 6 (tetrachlor), which are even higher than the dielectric constants of the same products in the liquid state.

In general, it may be said that capacitors embodying the present invention and being impregnated with a solid chlorinated compound of diphenylene oxide are equal, or even superior, to otherwise similar units impregnated with liquid chlorinated diphenyl or liquid chlorinated diphenyl oxide, such as described, for example, in my prior Patent No. 2,041,594, patented May 19, 1936.

In accordance with another feature of my invention I have provided capacitors having substantially constant electrical capacity when operated within a range of elevated temperatures normally encountered in practice, say from about 25° C. to 75° C.

In accordance with another feature of my invention I have provided capacitors which are stable in their characteristics when operated continuously at a relatively high temperature.

The accompanying drawing shows somewhat conventionally a capacitor embodying my invention.

Capacitors, one example of which is shown in the drawing, may comprise armatures 1, 2 of suitable metal, for example, aluminum foil, and interposed absorbent material 3, 4, 7. One single sheet is shown to render the drawing as simple as possible but it should be understood that the combination of three sheets of paper or cloth may be used, preferably three sheets of .0003 inch porous kraft paper. Terminals for external electrical connection 5 and 6 are provided for the armatures. When impregnated with monochlor diphenylene oxide, capacitors so constructed have a capacity of about 1 microfarad for each 5 to 6 square feet of active armature area. Capacitors otherwise similar, but which are impregnated with mineral wax, a commonly used solid dielectric material, require about 9 to 10 square feet of active armature surface for the same electrical capacity, showing an improvement of about 50%.

Similar capacitors impregnated with tetrachlor diphenylene oxide are characterized by about the same capacity and have a power factor of less than .5 per cent, when energized with 60 cycles alternating current at a potential of about 330 volts. Capacitors embodying my invention show excellent stability over long periods of time even when operated at elevated temperatures.

Although particular reference has been made to capacitors impregnated with the monochlor and tetrachlor compound of diphenylene oxide, other chlorinated compunds of diphenylene oxide are stable in characteristics at high temperatures and may be used with similar advantages for impregnating capacitors, cables and other capacitance devices, although the monochlor and tetrachor compounds are preferred. When substantial non-inflammability is desired, the tetra- and penta-chlor products should be used. Capacitors may be impregnated by using the desired product in a fused stated.

The production of chlorinated diphenylene oxide by the direct chlorination of diphenylene oxide is described in my copending application, Serial No. 131,633, filed March 18, 1937. Briefly, diphenylene oxide is chlorinated in the presence of a suitable catalyzer, such as iron or antimony, or the chlorides of these metals, the time and temperature of chlorination varying with the conditions and in accordance with the chlorinated products desired. For example, under a given set of conditions there was required for the preparation of the monochlor compound a temperature of about 125 to 150° C., the passage of chlorine through the fused diphenylene oxide being continued for 4 hours. For the preparation of a dichlor product the passage of chlorine should be continued for about 10 hours, the temperature being within the range of 125 to 180° C. For the preparation of the trichlor product the same temperature, but chlorination for 18 hours was required. For the preparation of the tetrachlor product about 25 to 30 hours was required, using the same temperature range. The products obtained under these conditions are mixtures of different isomers and unless especially purified are associated with some lower and some higher chlorination products.

The following table gives the properties of the mono-, di-, tri-, and tetrachlor products, these terms being used in the sense indicated above.

|  | Monochlor | Dichlor | Trichlor | Tetrachlor |
|---|---|---|---|---|
| Boiling range (25 mm.) °C | 190–210 | 220–240 | 235–250 | 245–270 |
| Melting point °C | 60–65 | 80–85 | 95–105 | 80–90 |
| Specific gravity 125°/15.5° | 1.20 | 1.27 | 1.31 | 1.37 |
| Condition | Solid | Waxy solid | Waxy solid | Solid |
| Color | White | White | White | White |
| 25° C. dielectric constant (solid) | 4 | 5 | 5.5 | 6.0 |
| 100° C. dielectric constant (liquid) | 3.7 | 3.9 | 4.6 | 5.0 |

By repeating the purification treatment, chlorinated diphenylene oxide products may be obtained which are substantially free from chlorination products other than the particular one indicated. For example, a trichlor diphenylene oxide may be obtained which contains very little dichlor, tetrachlor, and other products, and which has a more restricted melting and boiling temperature than the ranges indicated in this table.

Although the chlorinated products are preferred for capacitor impregnation, similar utilization for this purpose of other halogenation products, such as diphenylene oxide products containing substituted fluorine, bromine and iodine is not precluded.

As already stated and as indicated in the table of properties the dielectric constant of the various chlorinated isomeric mixtures of diphenylene oxide show no material decrease in capacity on solidification. The data as given indicates the high dielectric constant of the material at room temperature in the solid state as compared to the lower dielectric constant at 100° C. in the liquid state. The various chlorinated isomeric mixtures of diphenylene oxide also possess an unexpected and highly favorable constancy of dielectric characteristic in combination with paper or other impregnated dielectric. When the isomeric mixture consisting of the various pentachlor diphenyls or pentachlor diphenyl oxides is used to impregnate cellulosic insulation, the capacitors so prepared decrease in capacity in passing from 25° C. to 75° C. The normal drop expected is such that the capacity at 75° C. is from 4 per cent to 5 per cent lower than the 25° C. capacity. This is a disadvantage for in many capacitor applications stability of electrical capacity with normal temperature changes is highly desired. When the same dielectric comprising cellulosic material is impregnated with the isomeric mixtures of the chlorinated diphenylene oxide entirely unexpected results are obtained in that the capacity increases with an increase in temperature. From the actual dielectric constant measurements on the chlorinated products alone, this increase would not be expected. As an example of this surprising capacity characteristic, capacitors impregnated with the isomeric mixture of the trichlor diphenylene oxide may be considered. Kraft paper capacitors impregnated with this material showed a capacity at 25° C., 220 volts per mil, of 1,785 microfarads. At 75° C., the capacity was 1.980 microfarads, an increase of approximately 11 per cent. The following table gives the average percent increase in microfarad capacity for the various chlorinated isomeric mixtures in combination with kraft capacitor paper.

| Chlorinated isomeric mixture used as the impregnant | Per cent increase in capacity in passing from 25° C. to 75° C. |
|---|---|
| Monochlor diphenylenoxide | 15 |
| Dichlor diphenylenoxide | 6 |
| Trichlor diphenylenoxide | 5 |
| Tetrachlor diphenylenoxide | 10.5 |

Heretofore, it has been accepted that in order to obtain a constant electrical capacity for the treated paper dielectric, it is necessary to use an impregnant of low dielectric constant. The most common impregnant and the one best adapted to give a constant dielectric capacity with changing temperature has been assumed to be mineral oil. The unexpected behavior of the solid isomeric chlorinated mixtures of diphenylene oxide make available a capacitor of high and constant capacity characteristics.

It has already been stated that the isomeric mixture of pentachlor diphenyl or pentachlor diphenyl oxide behave as expected in that the treated condensers decrease in electrical capacity with increasing temperature. By properly blending the chlorinated diphenylene oxide products as herein described with such compounds as pentachlor diphenyl or pentachlor diphenyl oxide products, it is possible to obtain an impregnant which, when used to treat condenser paper, give a capacitor of constant electrical capacity with temperature change in the normal range met in practice (25° C. to 75° C.). For example, although a capacitor impregnated with a pentachlor diphenyl liquid mixture shows a decrease of 4 per cent in electrical capacity in passing from 25° C. to 75° C., when this same pentachlor diphenyl is associated with the trichlor diphenylene oxide mixture herein described in the ratio of 85 parts of the pentachlor diphenyl to 15 parts of the trichlor diphenylene oxide, the capacity change, in passing from 25° C. to 75° C., is reduced to approximately 2.9 per cent decrease. When the chlorinated diphenylene oxide constituent is in the range from 25 per cent to 30 per cent of the total mixture with pentachlor diphenyl, a substantially constant electrical capacity of the treated unit is obtained in passing from 25° C. to 75° C.

The following compositions introduced as impregnants in capacitors containing paper or other cellulosic insulation result in substantial constancy of capacity over a range of temperatures from 25 to 75° C.; mixtures of 20–25% monochlor diphenylene oxide and 80–75% pentachlor diphenyl; mixtures of 30–40% of dichlor diphenylene oxide and 70–60% pentachlor diphenyl; mixtures of 30–45% trichlor diphenylene oxide and 70–55% pentachlor diphenyl and mixtures of 25–30% of tetrachlor diphenylene oxide and 75–70% of pentachlor diphenyl. All of these mixtures are by weight. Corresponding effects can be obtained by utilizing any of the chlorinated isomeric mixtures of diphenylene oxide, although the monochlor mixture is most effective in this respect. However, in order to retain the non-inflammability of the final mixture the trichlor diphenylene oxide product or a product having a higher degree of chlorination should be used.

Chlorinated diphenylene oxide products herein described also are suitable for use in combination with mineral oil, waxes, tars, asphalts, pitches and other dielectric liquids and solids.

What I claim as new and desire to secure by Letters Patent of the United States is:

1. An electric capacitor having armatures and a dielectric material consisting to a substantial extent at least of chlorinated diphenylene oxide.

2. An electric capacitor comprising armatures, porous dielectric material therebetween and an impregnant for said material consisting essentially of solid chlorinated diphenylene oxide.

3. An electric capacitor having cooperating armatures and containing dielectric material consisting preponderantly of monochlor diphenylene oxide.

4. An electric capacitor having cooperating armatures and containing dielectric material consisting preponderantly of tetrachlor diphenylene oxide.

5. An electric capacitor having cooperating armatures and containing a dielectric material comprising as substantial and essential ingredients chlorinated diphenylene oxide and at least one of the group consisting of chlorinated diphenyl and chlorinated diphenyl oxide.

6. An electric capacitor comprising armatures, one or more layers of paper therebetween and an impregnant for said paper comprising as substantial and essential ingredients chlorinated diphenylene oxide and pentachlor diphenyl.

7. An electric capacitor comprising armatures, one or more layers of paper therebetween and an impregnant for said paper comprising by weight about 25 to 30 parts of tetrachlor diphenylene oxide and 75 to 70 parts of pentachlor diphenyl, said capacitor having a substantially constant capacity within a temperature range of 25 to 75° C.

8. An electric capacitor comprising armatures, a paper dielectric therebetween and an impregnant for said paper consisting essentially by weight of about 30 to 45 per cent of trichlor diphenylene oxide and about 70 to 55 per cent of pentachlor diphenyl, the capacity of said capacitor being substantially constant over a temperature range of 25 to 75° C.

FRANK M. CLARK.